United States Patent [19]
Abe

[11] Patent Number: 5,738,952
[45] Date of Patent: Apr. 14, 1998

[54] ENCLOSED-TYPE SECONDARY CELL

[75] Inventor: Takao Abe, Fukushima, Japan

[73] Assignee: Sony Corporation, Tokyo, Japan

[21] Appl. No.: 643,878

[22] Filed: May 7, 1996

[30] Foreign Application Priority Data

May 12, 1995 [JP] Japan .................... 7-114800

[51] Int. Cl.$^6$ ................................ H01M 2/12
[52] U.S. Cl. .................. 429/56; 429/7; 429/62; 429/174
[58] Field of Search .................. 429/7, 53, 56, 429/61, 62, 174

[56] References Cited

U.S. PATENT DOCUMENTS

| | | |
|---|---|---|
| 3,279,953 | 10/1966 | Bierdumpfel . |
| 4,207,385 | 6/1980 | Hayama ........................ 429/56 |
| 4,943,497 | 7/1990 | Oishi et al. ...................... 429/53 |
| 4,971,867 | 11/1990 | Watanabe et al. .............. 429/61 |
| 5,418,082 | 5/1995 | Taki et al. ...................... 429/53 |
| 5,427,875 | 6/1995 | Yamamoto et al. ............ 429/53 X |
| 5,464,705 | 11/1995 | Wainwright .................... 429/61 |

FOREIGN PATENT DOCUMENTS

| | | |
|---|---|---|
| A-573998 | 12/1993 | European Pat. Off. . |
| A-2406899 | 5/1979 | France . |

OTHER PUBLICATIONS

Patent abstracts of Japan vol. 18, No. 527 (E-1613) and JP-A-06 187957 (Toshiba Battery Co. Ltd.).

Primary Examiner—Stephen Kalafut
Attorney, Agent, or Firm—Hill, Steadman & Simpson

[57] ABSTRACT

An enclosed-type secondary cell comprises a safety valve (5) made of a metal plate which is deformed with an increase of an internal pressure of the secondary cell, a current interrupting means (6) energized when said safety valve (5) is deformed, an annular gasket (15) for holding an outer peripheral flange portion of the safety valve (5), and a disk (17) serving as a support for detaching a welded portion of a lead plate (17) and a safety valve convex portion (9) when the safety valve (5) is deformed. The annular gasket (15) includes a stepped portion (15e) within a bead-treatment area (21), and the disk (17) is fixed at its outer peripheral portion to the stepped portion (15e) of the annular gasket (15). This enclosed-type secondary cell has the current interrupting means which is energized when the safety valve (4) is deformed with an increase of the internal pressure within the enclosed-type secondary cell. Accordingly, the vacant space of the enclosed-type secondary cell is effectively utilized, and without decreasing a secondary cell capacity, the enclosed-type secondary cell is very strong against shock caused when it is dropped.

12 Claims, 4 Drawing Sheets

1

ENCLOSED-TYPE SECONDARY CELL

BACKGROUND OF THE INVENTION

The present invention relates to an enclosed-type secondary cell for use with a camera, a video tape recorder, a portable telephone, etc.

Secondary cells such as lithium battery or carbon-lithium battery have heretofore been used widely in a camera, a video tape recorder, a portable telephone, etc.

This kind of cell is of the enclosed-type, and spouts gases due to internal pressure increased when a generating element housed in the cell is affected by chemical change. When a non-aqueous electrolyte battery such as lithium secondary cell is overcharged by an excess current, electrolyte is decomposed, and hence gases are generated. If such state is continued, then electrolyte and active material are decomposed rapidly and a temperature of cell is raised so that gases are spouted.

U.S. Pat. No. 4,943,497 of the same assignee of the present application describes an enclosed-type secondary cell in which the aforesaid state can be avoided.

FIG. 1 of the accompanying drawings shows an example of an enclosed-type secondary cell.

As shown in FIG. 1, the enclosed-type secondary cell comprises a generating element 1, an outer container 2 with the generating element 1 housed therein, a lid 3 sealed to an open end of the outer container 2 through an annular gasket 4, a safety valve 5 provided within the lid 3, the safety valve 5 being made of a metal material deformed with a raised internal pressure of the secondary cell, and a current interrupting means 6 being energized as the safety valve 5 is deformed.

With respect to the example of the structure of the enclosed-type secondary cell described in U.S. Pat. No. 5,418,082 of the same assignee of this application, a main portion including the safety valve 5 and the current interrupting means 6 will be described with reference to FIG. 2.

As shown in FIG. 2, a safety valve 5 is formed of a disk-shaped metal plate material, and shaped as a saucer which is expanded toward the side in which the generating element 1 is disposed. The safety valve 5 has on its central portion disposed a safety valve convex portion 9 which is similarly protruded toward the side in which the generating element 1 is disposed. An outer peripheral flange portion of the safety valve 5 is overlapped with the outer peripheral portion of the lid 3 and the outer peripheral portion of a PTC (positive temperature coefficient) element 13, which are sealed to the opening portion of the outer container 2 through the insulating annular-gasket 4 by caulking.

A cylindrical-shaped insulating disk holder 11 is fitted into and held in the saucer-shaped outer peripheral portion of the safety valve 5.

A disk 12 is fitted into and held in the disk holder 11 in such a manner as to abut against each other. The saucer-shaped portion of the safety valve 5 and the disk 12 are isolated from each other by a plate portion 11a of the disk holder 11. The disk 12 has a central hole 12c defined at its central portion, and the safety valve convex portion 9 of the central portion of the safety valve 5 is inserted into the central hole 12. The tip end of the safety valve convex portion 9 is opposed to the generating element 1 side of the disk 12. A positive lead plate 7 of the generating element 1 is abutted against the tip end of the safety valve convex portion 9. This convex portion 9 and the positive lead plate 7 are welded at this abutted portion by ultrasonic welding.

If gases are generated from the storage portion of the generating element 1 due to any cause and the internal pressure is raised, then the internal pressure is applied through a through-hole 12w of the disk 12 to the safety valve 5 with the result that the safety valve 5 is expanded toward the lid 3 side as shown in FIG. 3. At that time, although the lead plate 7 welded to the safety valve convex portion 9 is elevated, the lead plate 7 cannot be moved due to the existence of the disk 12. As a result, the lead plate 7 is torn or removed to break an electrical connection between the lead plate 7 and the safety valve 5, resulting in the generating of gases being stopped. Therefore, the increase of internal pressure is suppressed more than this, and thus the current interrupting mean 6 is arranged.

Other example of the enclosed-type secondary cell, i.e., battery main portion including the safety valve 5 and the current interrupting means 6 will be described with reference to FIG. 4.

As shown in FIG. 4, the outer peripheral portion of the insulating disk holder 11 is overlapped on the outer peripheral portion of the safety valve 5, and further the outer peripheral portion of the disk 12 is superposed on the outer peripheral portion of the safety valve 5, which are sealed to the outer container 2 through the annular gasket 4. The current interrupting means 6 is arranged similarly as described above.

However, in the enclosed secondary cell, the safety valve 5 and the disk 12 are held into the disk holder 11 so that, when-this enclosed secondary cell is shocked in the direction of the generating element 1 by some causes such as drop, as shown in FIG. 5, the disk 12 and the disk holder 11 are moved. In the generating element 1 side, resulting in the welded portion of the lead plate 7 and the safety valve convex portion 9 being torn or the lead plate 7 and the safety valve convex portion 9 being removed, breaking an electrical connection therebetween.

Furthermore, in the enclosed-type secondary cell shown in FIG. 4, the disk 12 and the disk holder 11 also are caulked by the annular gasket 4 and the outer container 2 together with the safety valve 5, the lid 3 and the PTC element 13. Therefore, this enclosed-type secondary cell is strong against the shock of dropping or the like, but requires such space. As a result, as compared with other secondary cell of the same volume, the volume of the generating element 1 is decreased, and the capacity of this secondary cell is reduced.

SUMMARY OF THE INVENTION

In view of the aforesaid aspect, it is an object of the present invention to provide an enclosed-type secondary cell in which a current interruption can be prevented even when it is dropped and shocked, and in which a volume of a generating element can be maintained the same as that of the conventional one.

According to an aspect of the present invention, there is provided an enclosed-type secondary cell which is comprised of a container with a generating element provided therein, a safety valve made of a metal plate and having a convex portion protruded toward the generating element, an annular gasket with a stepped portion formed thereon and holding an outer peripheral portion of the safety valve, a disk disposed between the safety valve and the generating element and having an opening portion into which the convex portion of the safety valve is fitted, the disk being fixed between the safety valve and the annular gasket at the stepped portion of the annular gasket, and a lead plate being placed between the disk and the generating element and welded at the convex portion of the safety valve, wherein the welded portion of the safety valve and the lead plate is detached to interrupt a current when the safety valve is deformed as an internal pressure of the secondary cell is raised.

In accordance with another aspect of the present invention, there is provided an enclosed-type secondary cell which is comprised of a safety valve made of a metal plate and having a convex portion, a lead plate electrically connected to the convex portion of the safety valve, an current interrupting means composed of the safety valve and the lead plate, the current interrupting means being energized when the safety valve is deformed with an increase of an internal pressure of the enclosed-type secondary cell, an annular gasket with a stepped portion formed thereon and holding an outer peripheral portion of the safety valve, and a disk disposed between the safety valve and the lead plate and having an opening portion into which the convex portion of the safety valve is fitted, the disk being fixed between the safety valve and the annular gasket at the stepped portion of the annular gasket.

DETAILED DESCRIPTION OF THE PREFERRED EMBODIMENTS

An enclosed-type secondary cell according to a second embodiment of the present invention will be described below with reference to FIG. 6.

Figure 6:
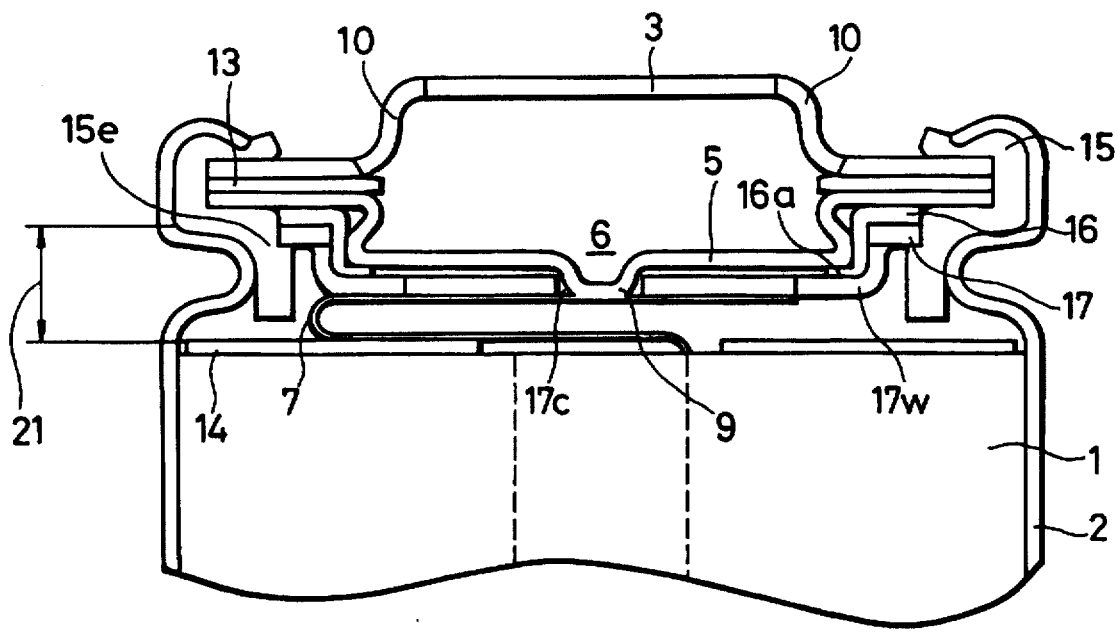
FIG. 6 is a fragmentary cross-sectional view illustrating an enclosed secondary cell according to an embodiment of the present invention.

As shown in FIG. 6, a generating element 1 comprises a sheet-like positive material and a sheet-like negative material which are wound around a separator with electrolyte in a cylinder fashion. Ribbon-like lead plates are led out to the negative side and the positive side, respectively, and the lead plate on the negative side is connected to the bottom surface of an outer container 2, although not shown.

Also in this embodiment, a current interrupting means 6 is disposed between the battery generating element 1 and a lid 3 which becomes a battery positive terminal.

Specifically, the safety valve 5 is made of a disk-like metal plate material, and the disk-like metal material made by press molding is shaped as a saucer which is expanded toward the side in which the battery generating element 1 is disposed. The safety valve 5 has on its central portion disposed a safety valve convex portion 9 which similarly expanded toward the side in which the battery generating element 1 is disposed. An outer flange portion of this safety valve 5 is superposed on the outer peripheral portion of the lid 3 and the outer peripheral portion of the PTC element 13, which are sealed to the opening portion of the outer container 2 through an insulating annular gasket 15 by caulking.

The lid 3 has a gas through-hole 10 defined thereon in order to remove gas to the outside, and the through-hole 10 is sealed and interrupted by the safety valve 5 from the outside, and the hermetic state can be maintained.

A saucer-like disk holder 16 made of an insulating plastic or the like is fitted with a pressure into the safety valve 5 at its outer peripheral portion of the saucer-shaped expanded portion. A saucer-like disk 17 is fitted with a pressure into the disk holder 16 at its outer peripheral portion of the saucer-like expanded portion.

A stepped portion 15e is formed on the annular gasket 15 in a range of bead-treatment area 21 of the outer container 2. The outer peripheral portion of the disk holder 16 and the outer peripheral portion of the disk 17 are held by the stepped portion 15e, and thereby fixedly held such that the disk holder 16 and the disk 17 cannot be moved toward the side in which the battery generating element 1 is disposed.

The bead-treatment area 21 is referred to an area treated by bead-treatment in the outer container 2. Precisely, when two planes which pass the upper and lower ends that are perpendicular to the central axis of the cylindrical outer container 2 and in which the outer container 2 in the bead-treatment portion begins to bend in the inside are considered, the bead-treatment area is referred to a space area sandwiched by these two planes.

The disk 17 is formed of a metal plate made of a material with suitable rigidity and thickness to the extent that a plane property can be maintained. The disk 17 has a central hole 17c and a plurality of through-holes 17w defined at other portions than the central portion symmetrically relative to the axis of the disk 17.

The safety valve convex portion 9 of the central portion of the safety valve 5 is inserted into the central hole 17 of the disk 17. The tip end of the safety valve convex portion 9 is opposed to the generating element 1 side of the disk 17, and the positive-side lead frame 7 of the generating element 1 is abutted against the tip end of the safety valve convex portion 9.

At this portion in which the positive-side lead frame 7 is abutted against the tip end of the safety valve convex portion 9, the convex portion 9 and the lead frame 7 are welded by ultrasonic welding or resistance welding.

In this manner, the positive lead 7 of the generating element 1 is electrically coupled to the lid 3 through the safety valve 5.

An insulating sheet 14 is disposed on the battery element 1.

As described above, since the stepped portion 15e is formed on the annular gasket 15 within the range of the bead-treatment area 21 of the outer container 2 and the outer peripheral portion of the disk holder 16 and the outer peripheral portion of the disk 17 are held and fixed by the stepped portion 15e so as not to move in the side in which the generating element 1 is disposed, when the enclosed-type secondary cell is dropped and shocked in the direction of the generating element 1, the disk 17 and the disk holder 16 can be prevented from being moved in the direction of the generating element 1. As a consequence, the welded portion of the lead plate 17 and the safety valve convex portion 9 can be prevented from being torn and detached, thereby making the electrical connection difficult to be broken.

Effects for avoiding the current interruption from being caused when the enclosed-type secondary cell according to the present invention is dropped have been examined.

Initially, five enclosed-type secondary cells with the structure of the present invention shown in FIG. 6 were manufactured, and examined by drop tests in which the above five enclosed-type secondary cells with their container bottoms down were dropped from the position 1.5 m high to a P tile through pipes. The following Table 1 show measured results of the drop test.

TABLE 1

| Cell Nos. | Number of drops leading to current interruption |
|---|---|
| 1 | 50 times, No current interruption discovered |
| 2 | 50 times, No current interruption discovered |
| 3 | 50 times, No current interruption discovered |
| 4 | 50 times, No current interruption discovered |
| 5 | 50 times, No current interruption discovered |

Study of the table 1 reveals that, even when the enclosed-type secondary cells according to the present invention have been continuously dropped fifty times, no current interruption discovered. Therefore, the enclosed-type secondary cells according to the present invention can achieve current interruption preventing effects considerably.

Figure 1:
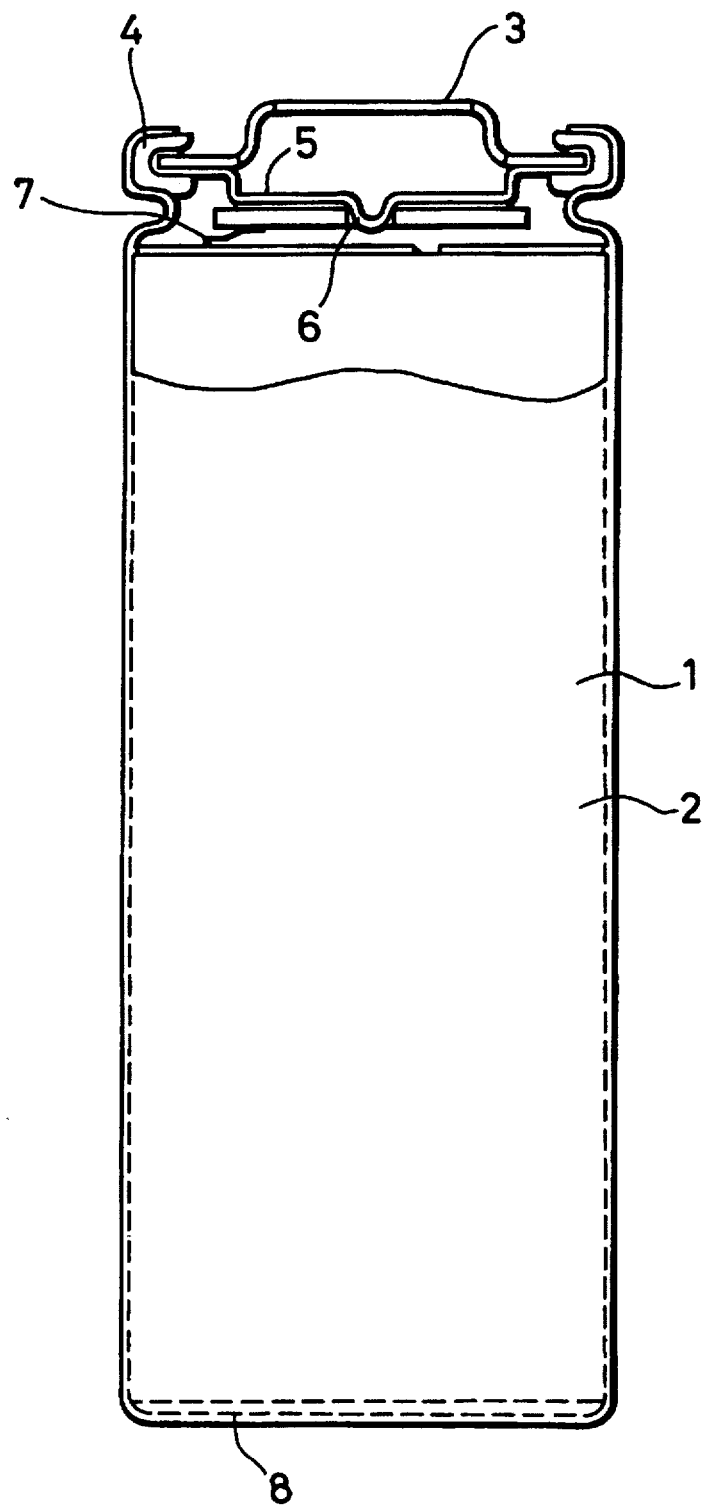
FIG. 1 is a side view, partly in cross-sectional form, of an enclosed-type secondary cell.
Figure 2:
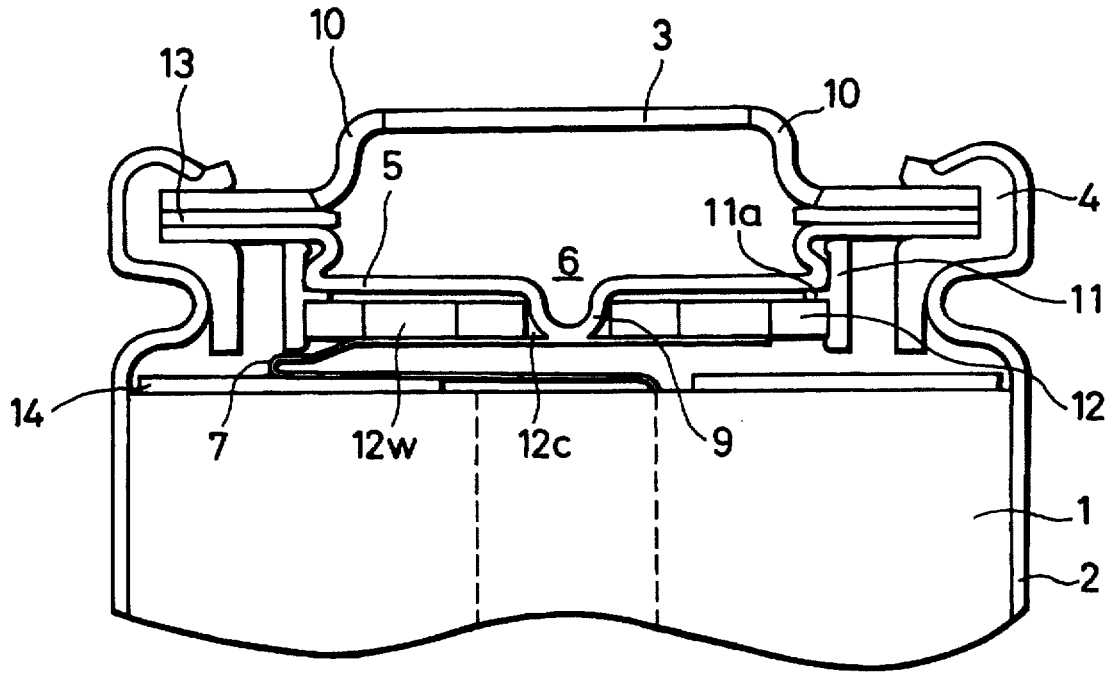
FIG. 2 is a fragmentary cross-sectional view illustrating an enclosed-type secondary cell placed in the normal state.
Figure 3:
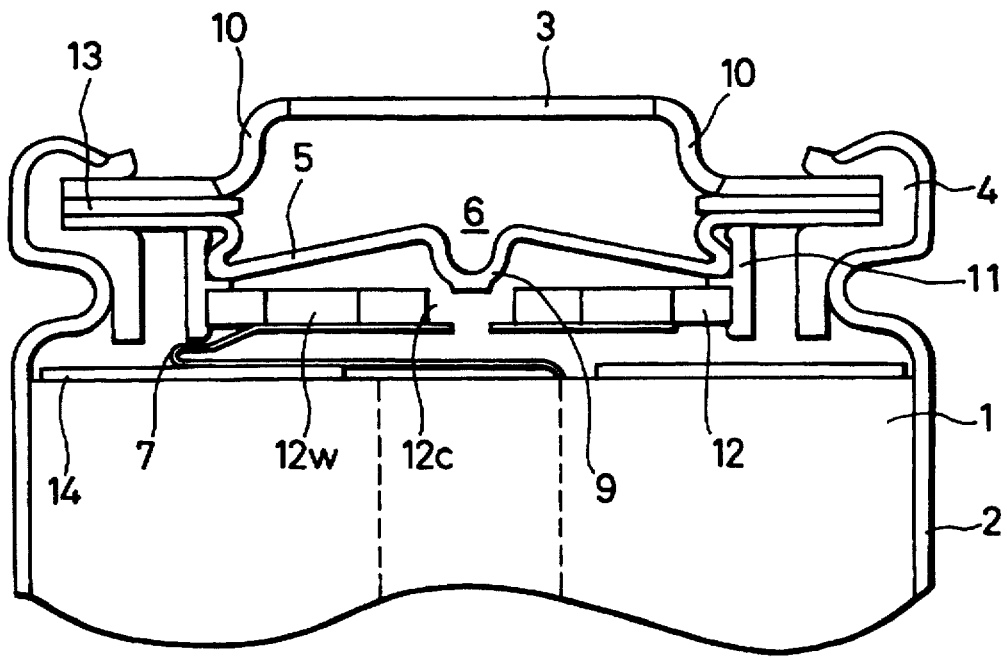
FIG. 3 is a fragmentary cross-sectional view illustrating the enclosed-type secondary cell in which a current is interrupted by the raised internal pressure.
Figure 4:
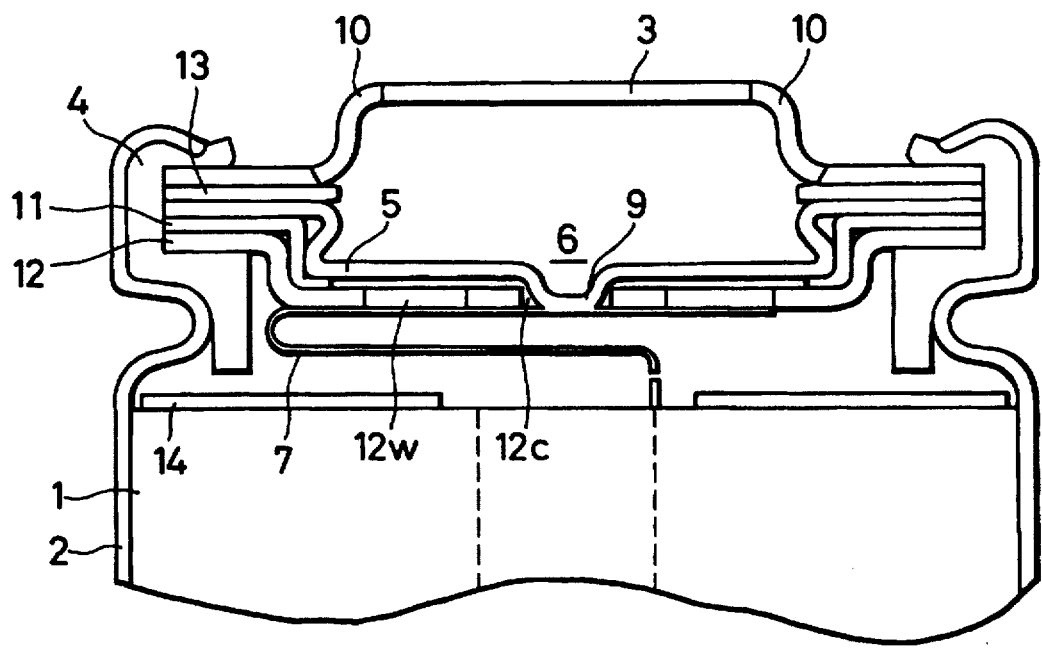
FIG. 4 is a fragmentary cross-sectional view illustrating other example of the enclosed-type secondary cell.
Figure 5:
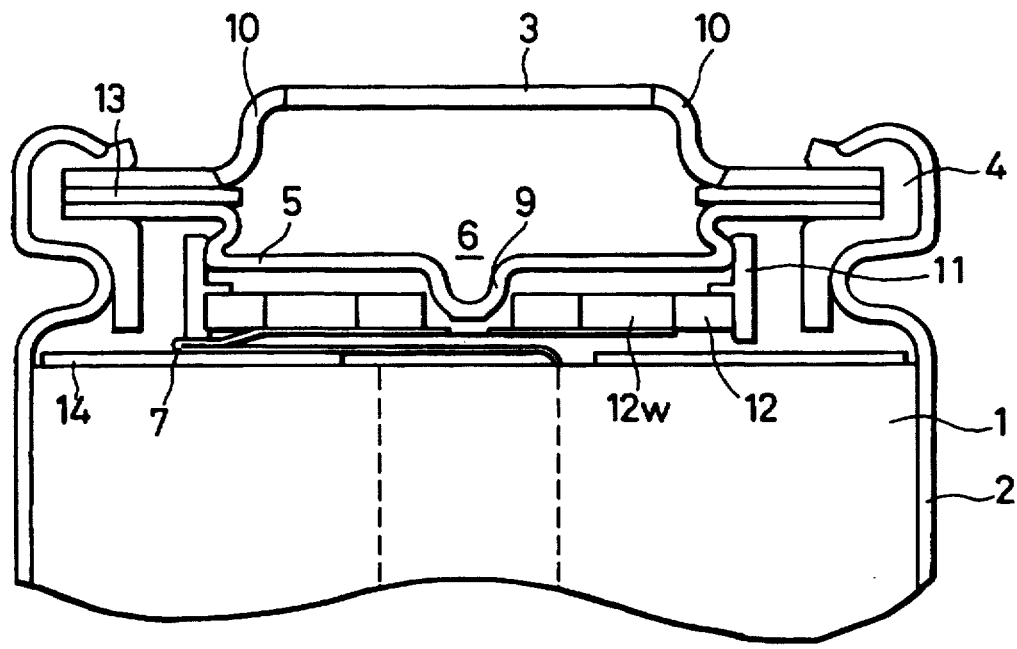
FIG. 5 is a fragmentary cross-sectional view illustrating the enclosed-type secondary cell in which a current is interrupted when it is dropped.

On the other hand, the five enclosed-type secondary cells with conventional structure shown in FIG. 2 were manufactured, and examined by similar drop tests. The table 2 below shows measured results of similar drop tests.

TABLE 2

| Cell Nos. | Number of drops leading to current interruption |
|---|---|
| 1 | 5 times, Current interruption occurred |
| 2 | 7 times, Current interruption occurred |
| 3 | 7 times, Current interruption occurred |
| 4 | 9 times, Current interruption occurred |
| 5 | 10 times, Current interruption occurred |

Study of the table 2 reveals that, when the conventional enclosed-type secondary cells have been continuously dropped five to 10 times, current interruption occurred. Thus, it is to be understood that the conventional enclosed-type secondary cells tend to cause current interruption as compared with the enclosed-type secondary cell according to the present invention.

Figure 7:
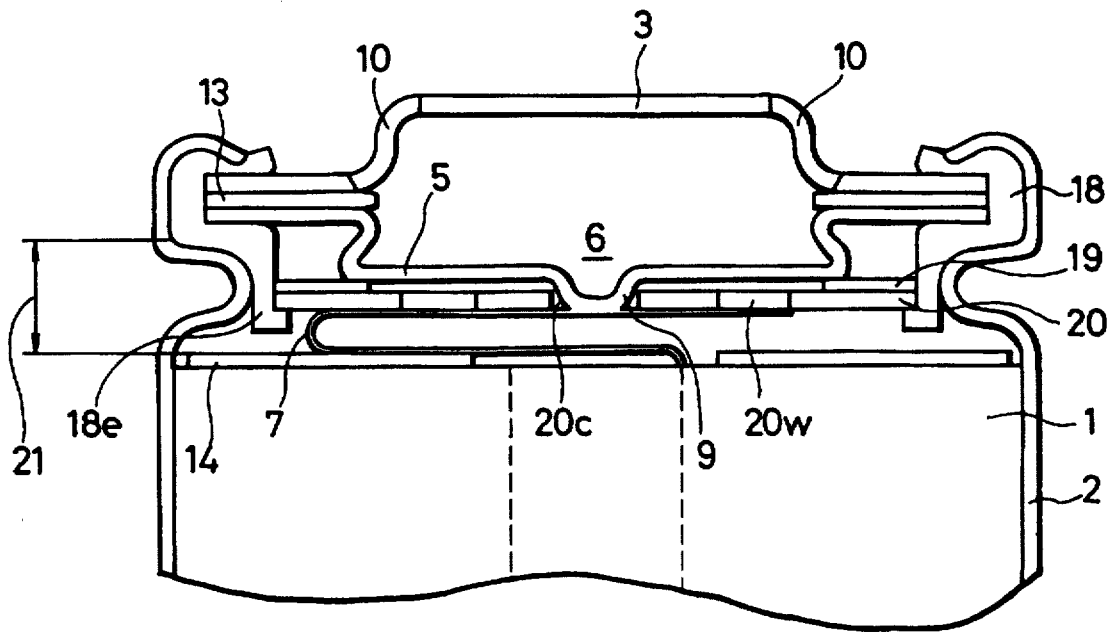
FIG. 7 is a fragmentary cross-sectional view illustrating an enclosed secondary cell according to another embodiment of the present invention.

An enclosed-type secondary cell according to another embodiment of the present invention will be described below with reference to FIG. 7. In FIG. 7, elements and parts identical to those of FIG. 6 are marked with the same reference numerals, and therefore need not be described in detail.

As shown in FIG. 7, the generating element 1 comprises the sheet-like positive material and the sheet-like negative material that are cylindrically wound around the separator with electrolyte soaked therein. Ribbon-like lead plates are led to the negative side and the positive side, and the lead plate on the negative side is connected to the bottom surface of the outer container 2, although not shown.

The safety valve 5 is made of a disk-like metal plate material, and is shaped as a saucer which is expanded toward the side in which the generating element 1 is disposed. The safety valve 5 includes at its central portion disposed the safety valve convex portion 9 which is similarly expanded toward the side in which the generating element 1 is disposed. The outer peripheral portion of the safety valve 5 is superposed upon the outer peripheral portion of the lid 3 and the outer peripheral portion of the PTC element 13, which are sealed to the opening portion of the outer container 2 through the insulating annular gasket 18.

The lid 3 has the gas through-hole 10 for evacuating gases, and the outer container 2 is sealed by the safety valve 5 so as to be isolated from the outside, and held in the hermetically-closed state.

Under the safety valve 5 are disposed a disk-like disk holder 19 made of an insulating plastic or the like and a disk 20 in an overlapping state.

The disk holder 19 and the disk 20 according to the second embodiment are shaped flat over the whole surface, and can be processed easily as compared with the disk holder 16 and the disk 17 shown in FIG. 6.

A stepped portion 18e is formed on an annular gasket 18 within a range of the bead-treatment area 21 of the outer container 2. An outer peripheral portion of the disk holder 19 and the outer peripheral portion of the disk 20 are held in the stepped portion 18e, and fixedly held therein so as not to be moved in the side in which the generating element 1 is disposed.

The disk 20 is formed of a metal plate made of a material and whose thickness is selected such that a proper rigidity for holding a plane property can be maintained. The disk 20 has a central hole 20c defined at its center, and has also a plurality of through-holes 20w for passing gases therethrough symmetrically defined relative to the axis of the disk 20.

The safety valve concave portion 9 of the safety valve 5 is fitted into the central hole 20c of the disk 20, and the tip end of the safety valve convex portion 9 is opposed to the generating side 1 of the disk 20. The positive-side lead plate 7 is abutted against the tip end of the safety valve convex portion 9.

At this portion in which the positive-side lead plate 7 is abutted against the tip end of the safety valve convex portion 9, the convex portion 9 and the lead plate 7 are welded by ultrasonic welding or resistance welding.

In this manner, the positive lead plate 7 of the generating element 1 is electrically connected to the lid 3 through the safety valve 5.

As described above, since the stepped portion 18e is formed on the annular gasket 18 within the range of the bead-treatment area 21 of the outer container 2, the outer peripheral portion of the disk holder 19 and the outer peripheral portion of the disk 20 are held by the stepped portion 18e, and thereby fixedly held so as not to move in the side in which the generating element 1 is disposed, even when this enclosed-type secondary cell is dropped and shocked in the direction of the generating element 1, the disk 20 and the disk holder 19 can be prevented from being moved in the direction of the generating element 1; and the welded portion of the lead plate 7 and the safety valve convex portion 9 can be prevented from being torn and detached, thereby making the electrical connection difficult to be broken.

Effects achieved by the enclosed-type secondary cell according to the second embodiment for preventing current interruption from being caused when the enclosed-type secondary cell is dropped have been examined so far.

The five enclosed-type secondary cells with structure according to the second embodiment shown in FIG. 7 were manufactured, and examined by drop texts in which the five enclosed-type secondary cells with their container bottoms down were dropped from the position of 1.5 m high to the P tile through a pipe. Measured results of the above drop tests were similar to those of the first embodiment, i.e., even when the enclosed-type secondary cells according to this embodiment were successively dropped 50 times, no current interruption occurred. Thus, it is to be understood that the enclosed-type secondary cell according to the second embodiment can achieve remarkable current interruption preventing effect.

As set forth, according to the present invention, it is possible to avoid the defect that, when the enclosed-type secondary cell is dropped, the current interrupting means is inadvertently energized to break the electrical connection.

Furthermore, according to the present invention, since the enclosed-type secondary battery is arranged such that the disk holder and the disk are fixed by effectively utilizing the bead-treatment area of the annular gasket, the enclosed-type secondary battery according to the present invention of the same volume as that of the conventional one can reduce the volume of the generating element, and can provide the same battery capacity.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An enclosed secondary cell comprising:
    a container with a generating element provided therein;
    a safety valve made of a metal plate and having a convex portion protruding toward said generating element;
    an annular gasket with a stepped portion formed thereon and holding an outer peripheral portion of said safety valve;
    a disk disposed between said safety valve and said generating element and having an opening portion into which said convex portion of said safety valve is fitted, said disk being fixed between said safety valve and said annular gasket at said stepped portion of said annular gasket; and
    a lead plate being placed between said disk and said generating element and welded at said convex portion of said safety valve, wherein said welded portion of said safety valve and said lead plate is detached to interrupt a current when said safety valve is deformed as an internal pressure of said secondary cell is raised.

2. An enclosed secondary cell as claimed in claim 1, wherein said convex portion is formed at substantially a central portion of said safety valve.

3. An enclosed secondary cell as claimed in claim 1, wherein said disk has a plurality of through-holes to introduce gases therethrough.

4. An enclosed secondary cell as claimed in claim 1, wherein said stepped portion of said annular gasket is positioned within a bead-treatment area.

5. An enclosed secondary cell according to claim 1, further comprising a PTC (positive temperature coefficient) element placed on an outer peripheral portion of said safety valve and a lid whose outer peripheral portion is placed on said PTC element, and wherein said outer peripheral portion of said safety valve, said outer peripheral portion of said PTC element and said outer peripheral portion of said lid are caulked to said container through said annular gasket.

6. An enclosed secondary cell according to claim 1, further comprising a disk holder placed between said disk and said safety valve, and wherein said disk holder is fixed between said safety valve and said annular gasket.

7. An enclosed secondary cell comprising:
    a safety valve made of a metal plate and having a convex portion;
    a lead plate electrically connected to said convex portion of said safety valve;
    current interrupting means composed of said safety valve and said lead plate, said current interrupting means being energized when said safety valve is deformed with an increase of an internal pressure of said enclosed-type secondary cell;
    an annular gasket with a stepped portion formed thereon and holding an outer peripheral portion of said safety valve; and
    a disk disposed between said safety valve and said lead plate and having an opening portion into which said convex portion of said safety valve is fitted, said disk being fixed between said safety valve and said annular gasket at said stepped portion of said annular gasket.

8. An enclosed secondary cell as claimed in claim 7, wherein said convex portion is formed at substantially a central portion of said safety valve.

9. An enclosed secondary cell as claimed in claim 7, wherein said disk has a plurality of through-holes to introduce gases therethrough.

10. An enclosed secondary cell as claimed in claim 7, wherein said stepped portion of said annular gasket is positioned within a bead-treatment area.

11. An enclosed secondary cell according to claim 7, further comprising a container with a generating element disposed therein, a PTC (positive temperature coefficient) element placed on an outer peripheral portion of said safety valve and a lid whose outer peripheral portion is placed on said PTC element, and wherein said outer peripheral portion of said safety valve, said outer peripheral portion of said PTC element and said outer peripheral portion of said lid are caulked to said container through said annular gasket.

12. An enclosed secondary cell according to claim 7, further comprising a disk holder placed between said disk and said safety valve, and wherein said disk holder is fixed between said safety valve and said annular gasket.

* * * * *